(12) United States Patent　　(10) Patent No.: US 11,070,393 B2
Yan　　(45) Date of Patent: Jul. 20, 2021

(54) POWER DELIVERY APPARATUS

(71) Applicant: GENERAL ELECTRIC TECHNOLOGY GMBH, Baden (CH)

(72) Inventor: Jun Yan, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/648,587

(22) PCT Filed: Sep. 7, 2018

(86) PCT No.: PCT/EP2018/074126
§ 371 (c)(1),
(2) Date: Mar. 18, 2020

(87) PCT Pub. No.: WO2019/057518
PCT Pub. Date: Mar. 28, 2019

(65) Prior Publication Data
US 2020/0274732 A1　　Aug. 27, 2020

(30) Foreign Application Priority Data

Sep. 22, 2017　(EP) .................................. 17192713

(51) Int. Cl.
*H04L 12/40*　　(2006.01)
(52) U.S. Cl.
CPC .............................. *H04L 12/40045* (2013.01)
(58) Field of Classification Search
CPC ... H04L 12/10; H04L 12/40045; H04L 25/02; H04B 10/80; H04B 10/801808;
(Continued)

(56) References Cited

U.S. PATENT DOCUMENTS 7,550,980 B2 *　6/2009　Picard .................... H04L 12/10
　　　　　　　　　　　　　　　　　　　　　324/691
7,782,240 B2 *　8/2010　Ng .................... H04L 12/40045
　　　　　　　　　　　　　　　　　　　　　341/155
(Continued)

FOREIGN PATENT DOCUMENTS

EP　　　3024172 A1　　8/1972

OTHER PUBLICATIONS

International Search Report of PCT/EP2018/074126 dated Oct. 1, 2018.
(Continued)

*Primary Examiner* — James M Perez
(74) *Attorney, Agent, or Firm* — Eversheds Sutherland (US) LLP

(57) ABSTRACT

A power delivery apparatus (20) comprises a power source device (22), a power sink device (24) and a data transmission link (26), the power source device (22) connected to one end of the data transmission link (26), the power sink device (24) selectively connectable to another end of the data transmission link (26), the data transmission link (26) configured to permit transmission of data between the power source device (22) and the power sink device (24) when the power sink device (24) is connected to the data transmission link (26), wherein the power source device (22) is configured to apply a periodic sensing voltage to the data transmission link (26), the power delivery apparatus (20) further including a sensing device configured to detect, via the application of the periodic sensing voltage to the data transmission link (26), whether the power sink device (24) is connected to the data transmission link (26), and the power source device (22) is configured so that, in response to the power sink device (24) being detected as connected to the data transmission link (26), the power source device (22) applies a power supply voltage to the data transmission link (Continued)

(26) to supply power to the power sink device (24) via the data transmission link (26) so as to enable a normal operation of the power sink device (24).

14 Claims, 3 Drawing Sheets

(58) Field of Classification Search
CPC .................. H04B 2203/54–2203/5429; H04B 2203/5462; H04B 2203/547; H04B 3/44; H04B 3/54; H04B 3/548
See application file for complete search history.

(56) References Cited

U.S. PATENT DOCUMENTS

| | | | | |
|---|---|---|---|---|
| 7,822,111 B2 * | 10/2010 | Sohn | ................ | H04L 25/03038 375/231 |
| 7,855,474 B2 * | 12/2010 | Maggiolino | ...... | H04L 12/40045 307/85 |
| 7,861,277 B2 * | 12/2010 | Keady | .......... | H04L 25/03885 725/127 |
| 8,097,982 B2 * | 1/2012 | Maggiolino | ...... | H04L 12/40045 307/85 |
| 8,108,723 B2 * | 1/2012 | Diab | ....... | H04L 12/10 714/24 |
| 8,464,081 B2 * | 6/2013 | Hussain | ........ | H04L 12/66 713/300 |
| 8,635,473 B2 * | 1/2014 | Karam | .......... | H04L 12/44 713/310 |
| 9,306,392 B2 * | 4/2016 | Davidson | .......... | H02J 4/00 |
| 9,501,117 B2 * | 11/2016 | Ma | ......... | H02J 7/00047 |
| 9,565,036 B2 * | 2/2017 | Zerbe | ........ | G06F 1/10 |
| 9,665,151 B1 * | 5/2017 | Zou | ......... | G06F 1/266 |
| 9,737,847 B2 * | 8/2017 | Zwayyed | ......... | B01D 53/1412 |
| 9,768,978 B2 * | 9/2017 | Coenen | .......... | H04L 12/403 |
| 9,819,523 B2 * | 11/2017 | Lee | ......... | H04L 25/03878 |
| 9,859,705 B2 * | 1/2018 | Whitehouse | .......... | H02J 1/00 |
| 9,972,997 B2 * | 5/2018 | Davidson | ........ | H02H 9/04 |
| 10,142,116 B2 * | 11/2018 | Huang | ......... | G06F 1/266 |
| 10,164,431 B2 * | 12/2018 | Karlak | .......... | G06Q 10/0631 |
| 10,224,712 B2 * | 3/2019 | Hassan | ........ | H02J 1/00 |
| 10,256,867 B2 * | 4/2019 | Heath | ......... | H04B 3/56 |
| 10,291,275 B2 * | 5/2019 | Lee | ........ | H04L 25/03878 |
| 10,419,066 B1 * | 9/2019 | Bonen | ......... | H04B 3/08 |
| 10,425,124 B1 * | 9/2019 | Wang | ........ | H03F 3/45179 |
| 10,461,809 B2 * | 10/2019 | Merrick | .......... | H05B 47/185 |
| 10,495,677 B2 * | 12/2019 | Parashar | ........ | G01R 25/00 |
| 10,594,367 B1 * | 3/2020 | Bhagwat | ......... | H04L 12/40045 |
| 10,673,477 B2 * | 6/2020 | Li | ........ | H04B 1/1607 |
| 10,681,848 B2 * | 6/2020 | Xiang | ........ | H02K 11/33 |
| 10,700,514 B2 * | 6/2020 | Whitehouse | ........... | H02H 7/268 |
| 10,735,105 B2 * | 8/2020 | Goergen | ............ | H04B 10/808 |
| 10,764,071 B1 * | 9/2020 | Ciholas | .......... | H04L 12/10 |
| 10,830,974 B2 * | 11/2020 | Grandidge | .......... | G02B 6/4284 |
| 10,931,105 B2 * | 2/2021 | Barker | ........ | H02J 3/36 |
| 2006/0077888 A1 * | 4/2006 | Karam | .......... | H04L 12/10 370/216 |
| 2006/0078093 A1 * | 4/2006 | Karam | .......... | H04L 12/10 379/24 |
| 2006/0100799 A1 * | 5/2006 | Karam | .......... | H04L 12/10 702/57 |
| 2006/0117089 A1 * | 6/2006 | Karam | .......... | H04L 1/22 709/208 |
| 2006/0268898 A1 * | 11/2006 | Karam | ........ | H04L 25/08 370/401 |
| 2007/0011547 A1 * | 1/2007 | Karam | .......... | H04L 12/10 714/746 |
| 2007/0133238 A1 * | 6/2007 | Herbold | .......... | H04L 12/10 363/63 |
| 2008/0098240 A1 * | 4/2008 | Hussain | .......... | H04L 12/66 713/300 |
| 2008/0238447 A1 * | 10/2008 | de la Torre Vega | .... | H04L 12/10 324/676 |
| 2009/0041004 A1 * | 2/2009 | Emmanuel | .......... | H04L 1/1671 370/352 |
| 2009/0210725 A1 * | 8/2009 | Kim | ......... | H04L 12/10 713/300 |
| 2009/0228721 A1 * | 9/2009 | Karam | .......... | H04L 12/10 713/300 |
| 2010/0321169 A1 * | 12/2010 | Hussain | .......... | H04L 12/66 713/300 |
| 2012/0011380 A1 * | 1/2012 | Dove | ........ | G06F 1/266 713/300 |
| 2014/0142765 A1 * | 5/2014 | Gammel | .......... | H04L 12/10 700/286 |
| 2015/0145324 A1 * | 5/2015 | Heath | .......... | H04L 12/40045 307/1 |
| 2018/0052504 A1 * | 2/2018 | Wendt | ......... | G06F 1/24 |
| 2018/0367319 A1 * | 12/2018 | Hamdi | .......... | G06F 1/266 |
| 2019/0068385 A1 * | 2/2019 | Gardner | .......... | H04L 12/40045 |
| 2019/0068479 A1 * | 2/2019 | Fu | ......... | H04L 12/40045 |
| 2019/0123919 A1 * | 4/2019 | Zhang | .......... | H04B 10/806 |
| 2019/0190727 A1 * | 6/2019 | LaBosco | .......... | G06F 1/28 |
| 2019/0331741 A1 * | 10/2019 | Hittel | ......... | H04L 43/50 |
| 2019/0386836 A1 * | 12/2019 | Gong | .......... | H04L 12/10 |
| 2020/0092118 A1 * | 3/2020 | Zhuang | .......... | H04L 12/10 |
| 2020/0228353 A1 * | 7/2020 | Fu | ........ | H04L 12/40045 |
| 2020/0274732 A1 * | 8/2020 | Yan | .......... | H04L 12/40045 |

OTHER PUBLICATIONS

European Search Report of European Application No. 17192713.0 dated Nov. 30, 2017.

* cited by examiner

POWER DELIVERY APPARATUS

This application claims priority to EP Application No. 17192713.0, filed Sep. 22, 2017, titled "Power Delivery Apparatus", and to PCT Application No. PCT/EP2018/074126, filed Sep. 7, 2018, titled "Power Delivery Apparatus", the contents of which are both incorporated by reference.

This invention relates to a power delivery apparatus for supplying electric power from a power source device to a power sink device via a data transmission link.

It is known to transmit electric power over Ethernet cables from a power source device to a power sink device.

According to an aspect of the invention, there is provided a power delivery apparatus comprising a power source device, a power sink device and a data transmission link, the power source device connected to one end of the data transmission link, the power sink device selectively connectable to another end of the data transmission link, the data transmission link configured to permit transmission of data between the power source device and the power sink device when the power sink device is connected to the data transmission link, wherein the power source device is configured to apply a periodic sensing voltage to the data transmission link, the power delivery apparatus further including a sensing device configured to detect, via the application of the periodic sensing voltage to the data transmission link, whether the power sink device is connected to the data transmission link, and the power source device is configured so that, in response to the power sink device being detected as connected to the data transmission link, the power source device applies a power supply voltage to the data transmission link to supply electric power to the power sink device via the data transmission link so as to enable a normal operation of the power sink device.

The configuration of the power delivery apparatus of the invention allows the automatic sensing of the connection of the power sink device and the subsequent transmission of electric power to enable the normal operation of the power sink device. This beneficially removes the need for the power sink device to be provided with a dedicated power supply, which not only improves the plug and play capability of the power sink device but also reduces the amount of hardware required for the functioning of the power sink device.

The automatic sensing feature of the power delivery apparatus is aided by the use of the periodic sensing voltage in the detection of the connectivity of the power sink device to the data transmission link. When compared to the use of a constant sensing voltage, the use of the periodic sensing voltage not only reduces the amount of power consumed by the automatic sensing feature but also reduces the risk of electrical shock to a user that comes into contact with the data transmission link, without any significant adverse impact on the detection capability of the sensing device.

It will be appreciated that the power source device may include a built-in electrical source or may be connected to an external electrical source, whereby the electrical source is configured to enable the power source device to apply the periodic sensing voltage to the data transmission link. Such an electrical source may be in the form of, for example, a current source.

It will be appreciated that the power source device may include a built-in electrical source or may be connected to an external electrical source, whereby the power source is configured to enable the power source device to apply the power supply voltage to the data transmission link. Such an electrical source may be in the form of, for example, a voltage source.

In a preferred embodiment of the invention, the sensing device may be configured to detect, via the application of the periodic sensing voltage to the data transmission link, a signature resistance of the power sink device when the power sink device is connected to the data transmission link. This provides a reliable means of detecting the connectivity of the power sink device to the data transmission link.

In further embodiments of the invention the power source device may include a voltage compensation circuit configured to selectively modify the power supply voltage so as to provide a modified power supply voltage to compensate for a voltage drop on the data transmission link.

The provision of the voltage compensation circuit enables the power source device to compensate for power losses in the data transmission link to ensure delivery of sufficient electric power to the power sink device, thus removing the need for a voltage compensation circuit in the power sink device.

In such embodiments, the power source device may be configured to receive information (e.g. a voltage) corresponding to a length of the data transmission link and to process the information to determine the modified power supply voltage. This allows the voltage compensation circuit to work with a range of lengths of the data transmission link in order to ensure the application of a suitable power supply voltage.

Optionally the power source device may include a voltage boost device configured to selectively boost the power supply voltage. Such a voltage boost device may be in the form of, for example, a boost converter.

The inclusion of the voltage boost device in the power source device increases the voltage range of the power supply voltage, which obviates the need to use a high power supply voltage in combination with a voltage buck circuit in the power sink device.

In such embodiments when employing the use of the voltage compensation circuit, the voltage boost device may be configured to selectively boost the power supply voltage so as to provide the modified power supply voltage. This provides a reliable means for providing the modified power supply voltage for voltage drop compensation purposes.

Preferably the periodic sensing voltage is lower than the power supply voltage. For example, the periodic sensing voltage may be at least an order of magnitude lower than the power supply voltage. The configuration of the power delivery apparatus of the invention permits the use of such a low periodic sensing voltage without any significant adverse impact on the detection capability of the sensing device.

The invention can be used in any application which requires delivery of power from a power source device to a power sink device via a data transmission link. The data transmission link may be, but is not limited to, any one of: an Ethernet data transmission link, a Registered Jack 45 (RJ45) data transmission link, a Universal Serial Bus (USB) data transmission link, a Serial AT Attachment (SATA) data transmission link, and a High Definition Multimedia Interface (HDMI) data transmission link.

The invention can be used across a wide range of applications, examples of which are described as follows.

In an exemplary embodiment of the power delivery apparatus, the power source device may be a switching controller, and the power sink device may be a human-machine interface device. Optionally the switching controller may be an intelligent electronic device.

The invention may be applied to a power distribution network which comprises the power delivery apparatus according to any of the embodiments described hereinabove. Such a power distribution network may include a substation controller and an input-output module, wherein the substation controller is configured as the power source device and wherein the input-output module is configured as the power sink device. The input-output module may be a distributed or remote input-output module.

A preferred embodiment of the invention will now be described, by way of a non-limiting example, with reference to the accompanying drawings in which.

Figure 1:
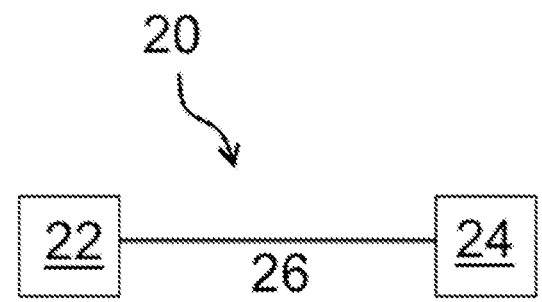
FIG. 1 shows schematically a power delivery apparatus according to an embodiment of the invention.

A power delivery apparatus according to an embodiment of the invention is shown in FIG. 1 and is designated generally by the reference numeral 20.

The power delivery apparatus 20 comprises a power source device, a power sink device, and a data transmission link. The power source device is configured for connection to input pins at one end of the data transmission link, and the power sink device is configured for connection to output pins at another end of the data transmission link. In the embodiment shown, the power source device is in the exemplary form of a substation controller 22, the power sink device is in the exemplary form of an input-output (IO) module 24, and the data transmission link is in the exemplary form of an Ethernet cable 26 which is configured to permit transmission of data between the substation controller 22 and the power sink device when the substation controller 22 and power sink device are interconnected via the Ethernet cable 26.

Figure 2:
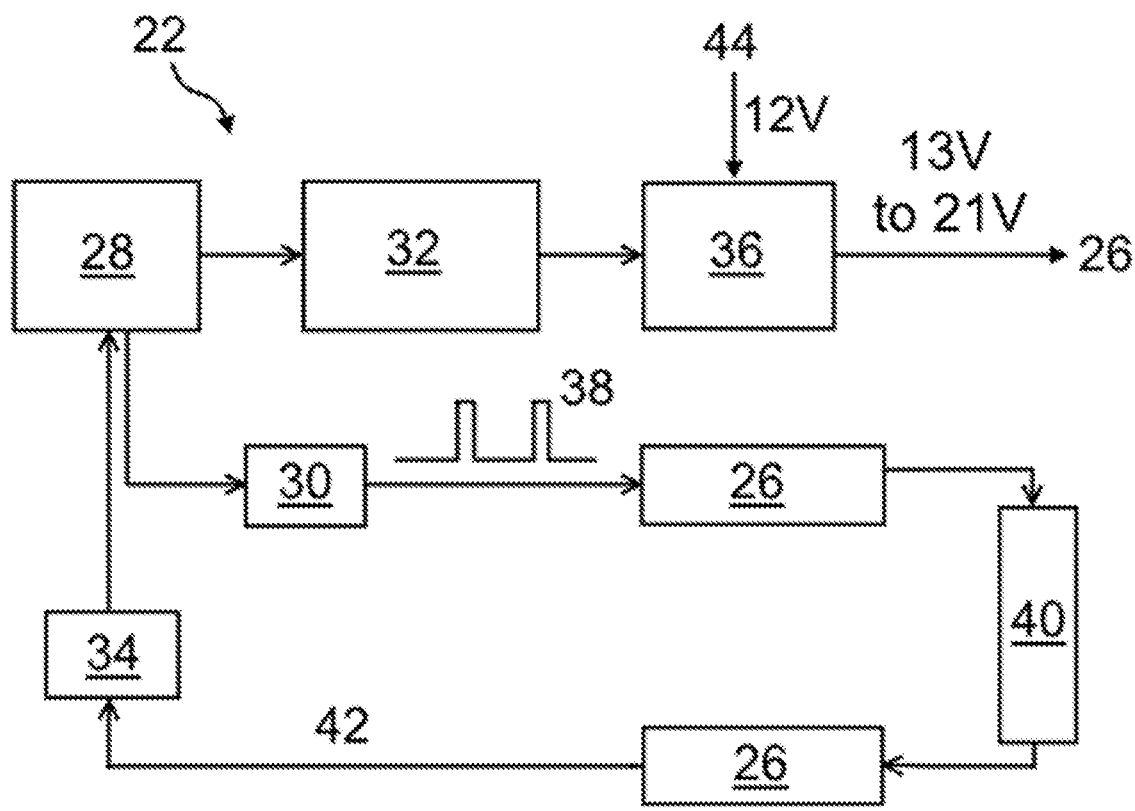
FIG. 2 shows schematically a power source device of the power delivery apparatus of FIG. 1.

FIG. 2 shows the structure of the substation controller 22. The substation controller 22 includes a control unit in the exemplary form of a host processor 28, a detection drive in the exemplary form of a current source 30, a pulse width modulation (PWM) voltage drive 32, a sensing device in the exemplary form of a voltage sensor 34, and a voltage boost device in the exemplary form of a boost DC-DC converter 36.

Figure 3:
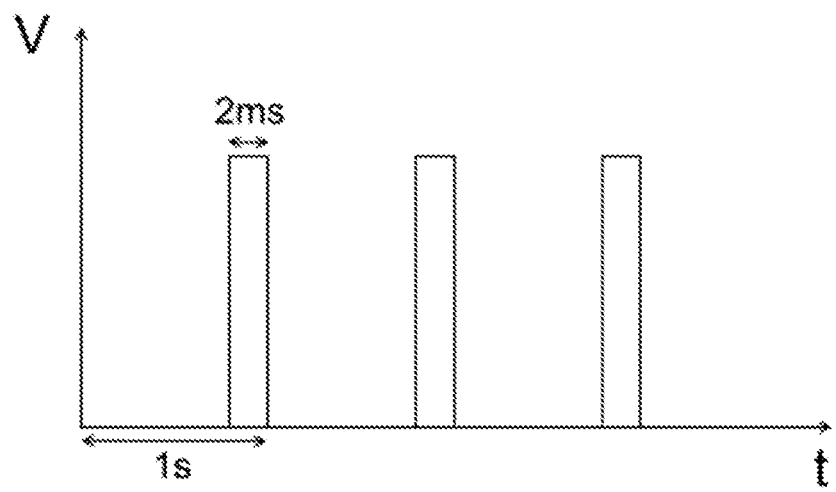
FIG. 3 shows an exemplary periodic sensing voltage for use by the power source device of FIG. 2.

The host processor 28 controls the current source to generate a fixed width periodic current pulse 38 for supply to the Ethernet cable 26. The fixed width periodic current pulse 38 is defined so that it consists of a non-zero current applied for a duration of 2 ms over a period of 1 s and a zero current applied over the remainder of the period. This in turn results in the application of a periodic sensing voltage to the Ethernet cable 26 when it is connected to a load 40. FIG. 3 shows the periodic sensing voltage.

The voltage sensor 34 is configured to detect, via the application of the periodic sensing voltage to the Ethernet cable 26, whether the IO module 24 is connected to the other end of the Ethernet cable 26. In particular, when the periodic sensing voltage is applied to the Ethernet cable 26, the voltage sensor 34 is configured to detect a voltage 42 corresponding to the signature resistance of the IO module 24 when the IO module 24 is connected to the other end of the Ethernet cable 26.

When the voltage sensor 34 detects the voltage 42 corresponding to the signature resistance of the IO module 24, the voltage sensor 34 will communicate the successful detection of the connection between the IO module 24 and the Ethernet cable 26 to the host processor 28. The host processor 28 will then control the PWM voltage drive 32 to supply a PWM voltage signal for driving the boost DC-DC converter, which is configured to receive an input voltage of 12V from an external voltage source 44. The host processor 28 will also trigger the closure of a load switch in order to switch the boost DC-DC converter into circuit with the input pins of the Ethernet cable 26. The closure of the load switch allows the boost DC-DC converter to supply power to the Ethernet cable 26. The PWM voltage signal is defined so that the boost DC-DC converter generates an output voltage for supply to the Ethernet cable 26. In this manner the substation controller 22 applies a constant power supply voltage to the Ethernet cable 26 to supply electric power to the IO module 24 via the Ethernet cable 26, which enables the IO module 24 to carry out its normal operation.

When a different load 40 (e.g. a short circuit load or an open circuit load) is connected to the other end of the Ethernet cable 26, the voltage 42 detected by the voltage sensor 34 will vary from the voltage 42 corresponding to the signature resistance of the IO module 24. The voltage sensor 34 will then communicate the detection of the different load to the host processor 28. As a result the PWM voltage drive 32 is not controlled to provide a PWM voltage signal to the boost DC-DC converter 36, and the load switch is kept open (or opened if previously closed).

Using a periodic sensing voltage, instead of a constant sensing voltage, to detect the connectivity of the IO module 24 to the Ethernet cable 26 not only reduces the amount of power consumption and risk of electrical shock to a user during the detection process but also improves the speed at which electric power can be supplied to the IO module 24 upon successful detection of the connection. The use of the periodic sensing voltage therefore results in an improved power delivery apparatus 20 in terms of cost, safety and responsiveness.

Figure 4:
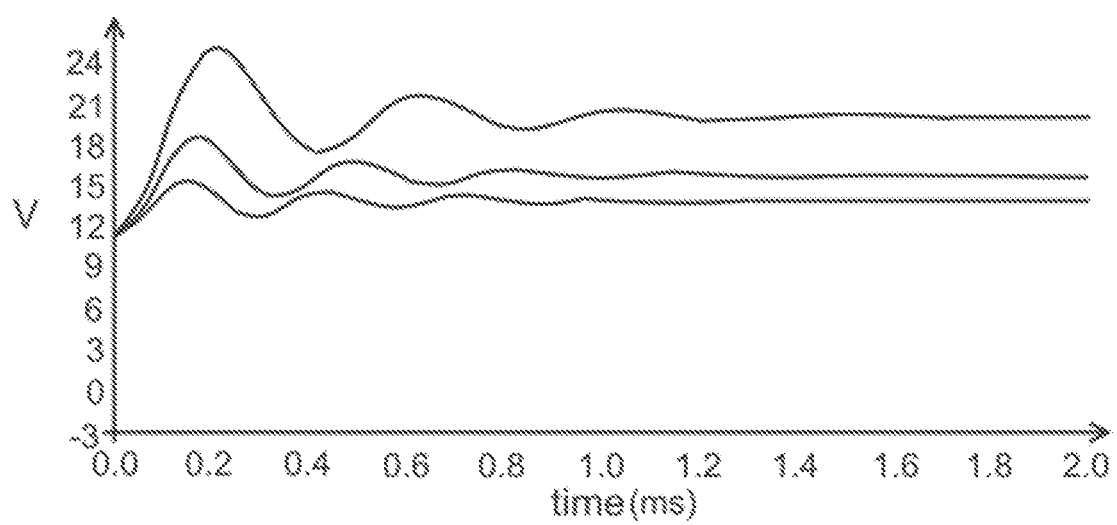
FIG. 4 illustrates an exemplary operation of the power source device of FIG. 2.

When the substation controller 22 supplies the electric power to the IO module 24 via the Ethernet cable 26, the host processor 28 may modify the duty cycle of the PWM voltage signal to enable the boost DC-DC converter to modify the input voltage so that a boosted constant power supply voltage, e.g. 13V to 21V, is applied to the Ethernet cable 26 to increase the electric power supplied via the Ethernet cable 26. FIG. 4 illustrates the ability of the boost DC-DC converter 36 to apply different boosted power supply voltages to the Ethernet cable 26.

The ability to boost the power supply voltage in the above manner enables the supply of electric power to the IO module 24 by the power delivery apparatus 20 to be responsive to a change in load connected to the other end of the Ethernet cable 26, thus ensuring economic and reliable delivery of electric power.

In addition the ability to boost the power supply voltage in the above manner enables the boost DC-DC converter 36 to be operated as a voltage compensation circuit. This enables the supply of electric power to the IO module 24 to take into account power losses arising from a voltage drop on the Ethernet cable 26 during the transmission of electric power via the Ethernet cable 26, thus ensuring the delivery of sufficient electric power to the IO module 24. Such a feature is particularly useful when the IO module 24 is located at a remote location relative to the substation controller 22 (as seen in communications networks and power distribution networks), thereby requiring a long distance connection between the substation controller 22 and the IO module 24.

Figure 5:
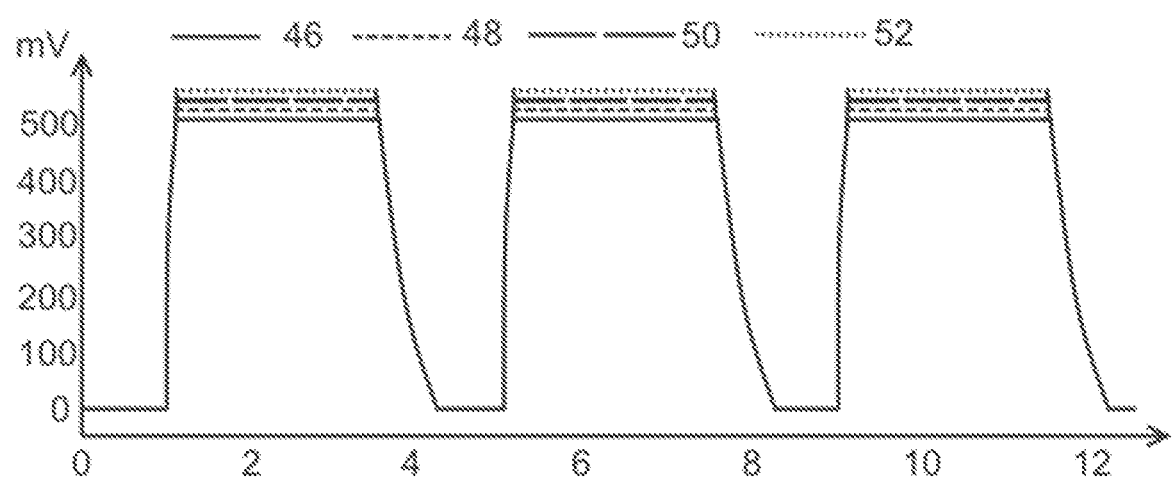
FIG. 5 illustrates another exemplary operation of the power source device of FIG. 2.

The extent to which the constant power supply voltage is boosted depends on the length of the Ethernet cable 26, since the voltage drop on the Ethernet cable 26 varies with the impedance of the Ethernet cable 26 which in turn varies with the length of the Ethernet cable 26. In a preferred form of the embodiment, the host processor 28 includes an analogue-to-digital input terminal which is configured to receive an input voltage from the Ethernet cable 26, whereby the received input voltage varies with the length of the Ethernet cable 26. FIG. 5 illustrates the variation of the received input voltage 46,48,50,52 with different lengths of the Ethernet cable 26. The host processor 26 then compares the received input voltage with a look-up table to determine the level of boost required for the power supply voltage and thereby control the PWM voltage drive 32 accordingly.

The provision of the boost DC-DC converter 36 in the substation controller 22 increases the voltage range capability of the power delivery apparatus 20, which enables it to provide safe and efficient power delivery across a wide range of configurations based on different cable lengths and different types of IO modules. This is in contrast to conventional Power over Ethernet (PoE) setups based on the use of a fixed power supply voltage and requiring compliance with specific power delivery standards, which renders the conventional PoE setups incompatible for use with certain cable lengths and certain types of IO modules.

It will be appreciated that the substation controller 22, the IO module 24 and the Ethernet cable 26 of the embodiment shown are merely chosen to help illustrate the working of the invention, and may be respectively replaced by other types of power source device, power sink device and data transmission link. In one example, the power source device may be a switching controller (e.g. an intelligent electronic device) and the power sink device may be a human-machine interface device. In another example, the IO module 24 may be a distributed or remote input-output module. The Ethernet cable 26 in the embodiment shown may be replaced by, but is not limited to, another type of RJ45 cable, a USB cable, a SATA cable, and a HDMI cable.

It will be appreciated that each of the numerical values used to describe the above embodiments are merely chosen to help illustrate the working of the invention, and may be replaced by another suitable numerical value.

The invention claimed is:

1. A power delivery apparatus comprising a power source device, a power sink device and a data transmission link, the power source device connected to one end of the data transmission link, the power sink device selectively connectable to another end of the data transmission link, the data transmission link configured to permit transmission of data between the power source device and the power sink device when the power sink device is connected to the data transmission link, wherein the power source device is configured to apply a periodic sensing voltage to the data transmission link, the power delivery apparatus further including a sensing device configured to detect, via the application of the periodic sensing voltage to the data transmission link, whether the power sink device is connected to the data transmission link, and the power source device is configured so that, in response to the power sink device being detected as connected to the data transmission link, the power source device applies a power supply voltage to the data transmission link to supply electric power to the power sink device via the data transmission link so as to enable a normal operation of the power sink device.

2. The power delivery apparatus according to claim 1, wherein the sensing device is configured to detect, via the application of the periodic sensing voltage to the data transmission link, a signature resistance of the power sink device when the power sink device is connected to the data transmission link.

3. The power delivery apparatus according to claim 1, wherein the power source device includes a voltage compensation circuit configured to selectively modify the power supply voltage so as to provide a modified power supply voltage to compensate for a voltage drop on the data transmission link.

4. The power delivery apparatus according to claim 3, wherein the power source device is configured to receive information corresponding to a length of the data transmission link and to process the information to determine the modified power supply voltage.

5. The power delivery apparatus according to claim 1, wherein the power source device includes a voltage boost device configured to selectively boost the power supply voltage.

6. The power delivery apparatus according to claim 3, wherein the power source device includes a voltage boost device configured to selectively boost the power supply voltage, and wherein the voltage boost device is configured to selectively boost the power supply voltage so as to provide the modified power supply voltage.

7. The power delivery apparatus according to claim 1, wherein the periodic sensing voltage is lower than the power supply voltage.

8. The power delivery apparatus according to claim 7, wherein the periodic sensing voltage is at least an order of magnitude lower than the power supply voltage.

9. The power delivery apparatus according to claim 1, wherein the data transmission link is any one of: an Ethernet data transmission link, a RJ45 data transmission link, a USB data transmission link, a SATA data transmission link, and a HDMI data transmission link.

10. The power delivery apparatus according to claim 1, wherein the power source device is a switching controller, and the power sink device is a human-machine interface device.

11. The power delivery apparatus according to claim 10, wherein the switching controller is an intelligent electronic device.

12. A power distribution network comprising the power delivery apparatus according to claim 1.

13. The power distribution network according to claim 12 including a substation controller and an input-output module, wherein the substation controller is configured as the power source device and wherein the input-output module is configured as the power sink device.

14. The power distribution network according to claim 13, wherein the input-output module is a distributed or remote input-output module.

* * * * *